Figure 1:
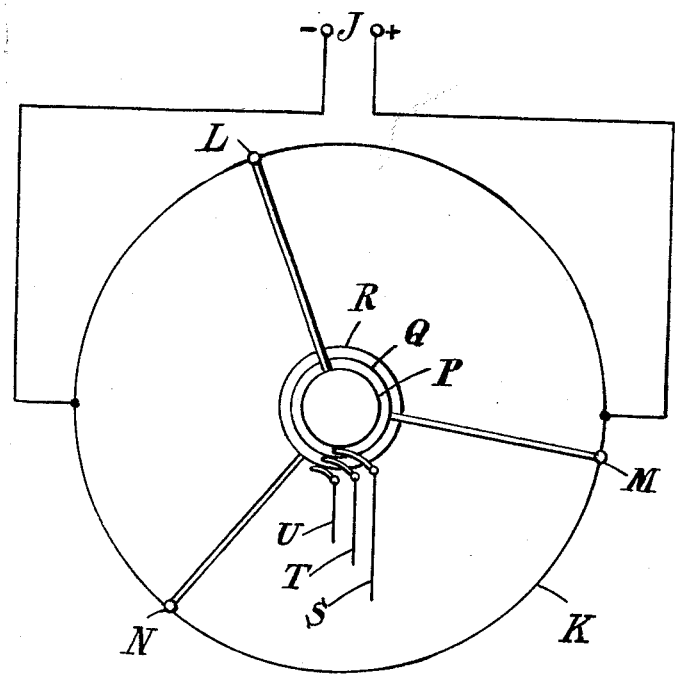

United States Patent Office 3,089,078
Patented May 7, 1963

3,089,078
DIRECT CURRENT TO THREE-PHASE ROTATING CONVERTER
Alfred John Smith and Kenneth Roland Mellin, Derby, England, assignors to Rolls-Royce Limited, Derby, England, a British company
Filed Feb. 25, 1959, Ser. No. 795,433
Claims priority, application Great Britain Mar. 5, 1958
1 Claim. (Cl. 321—49)

This invention comprises improvements in or relating to electric power supply arrangements giving a three-phase supply from a direct current source.

Such a three-phase supply could be obtained by use of a ring resistor having the D.C. source connected to it at diametrically opposite points and having three equally spaced contact elements which run in contact with it and lead to respective output connections. Such an arrangement has a number of disadvantages including the fact that current flows continuously throughout the length of the ring resistor with consequent inefficient use of the current supply and also that the output is not truly sinusoidal.

This invention has for an object to provide a more efficient electric power supply arrangement.

According to the present invention, an electric power supply arrangement comprises a large number of contact studs arranged in a ring, in angularly-spaced relation, a rotatably-driven member having three equi-angularly-spaced contact elements which co-operate with the studs and on rotation of the rotatively-driven member engage the contact studs successively, separate electrical output connections leading from each contact element whereby each pair of the contact elements may be connected to a corresponding load, and electrical input connections of selected electrical resistance connecting respective sets of the contact studs to the D.C. supply, the contact studs and the input connections being arranged such that the output from each pair of contact elements is substantially sinusoidal and that for each angular position of the rotatively-driven member some of the studs and input connections to them are inoperative to carry current. With the invention, at any instant part only of the electric power supply arrangement is connected to the load.

In one preferred form, the D.C. supply means is a simple D.C. source supplying all the studs except a diametrically opposite pair which are isolated. The set of studs to one side of the diameter connecting the isolated studs are connected electrically together and to the positive supply lead from the source, and the set of studs to the other side of the diameter are connected together and to the negative lead. The connections between the studs are effectively symmetrical about the diameter and the connections between the studs of a set comprise both resistors and short circuiting connections and are such that the stud potential pattern in one quadrant of the set is repeated symmetrically in the other quadrant of the set. By suitably selecting the values of the various resistors between adjacent studs a truly sinusoidal current, for a given load, can be supplied to the motor windings. With this arrangement, even though the studs at positive potential are interconnected and the studs at negative potential are interconnected, there are at any instant in the rotation of the rotatably-driven member a number of the connections which do not carry current.

Another preferred arrangement, a large, even number of contact studs, a first plurality of resistors connected in series between one pole of the D.C. source and a first of the contact studs, a second and corresponding plurality of resistors connected in series between the other pole of the D.C. source and a second of the contact studs which is diametrically opposite said first stud, the remaining studs on one side of the diameter joining said first and second studs being each connected to the symmetrically positioned stud on the other side of the diameter to form a series of equi-potential pairs of studs, and a third plurality of resistors connected in series between the poles of the D.C. source, the total resistance of the third plurality of resistors being substantially greater than the phase resistance of the load; and the total resistance of the first and second plurality of resistors being small compared with the phase resistance, a plurality of the pairs of equi-potential contact studs which are next adjacent said one contact stud being connected one to each junction between the first plurality of resistors, the next adjacent pair of contact studs to said plurality of pair being connected directly to said one pole, a further plurality of the pairs of equi-potential contact studs which are next adjacent the second contact stud being connected one to each junction between the second plurality of resistors, the next adjacent pair of contact studs to said further plurality being connected directly to said other pole, and the remaining pairs of equi-potential contact studs, which extend angularly between the pair directly connected to one pole and the pair connected directly to the other pole, being connected seriatum to the junctions of the third plurality of resistors.

With all the arrangements above set forth the speed of rotation is dependent on the speed of rotation of the rotatably-driven member.

Figure 2:
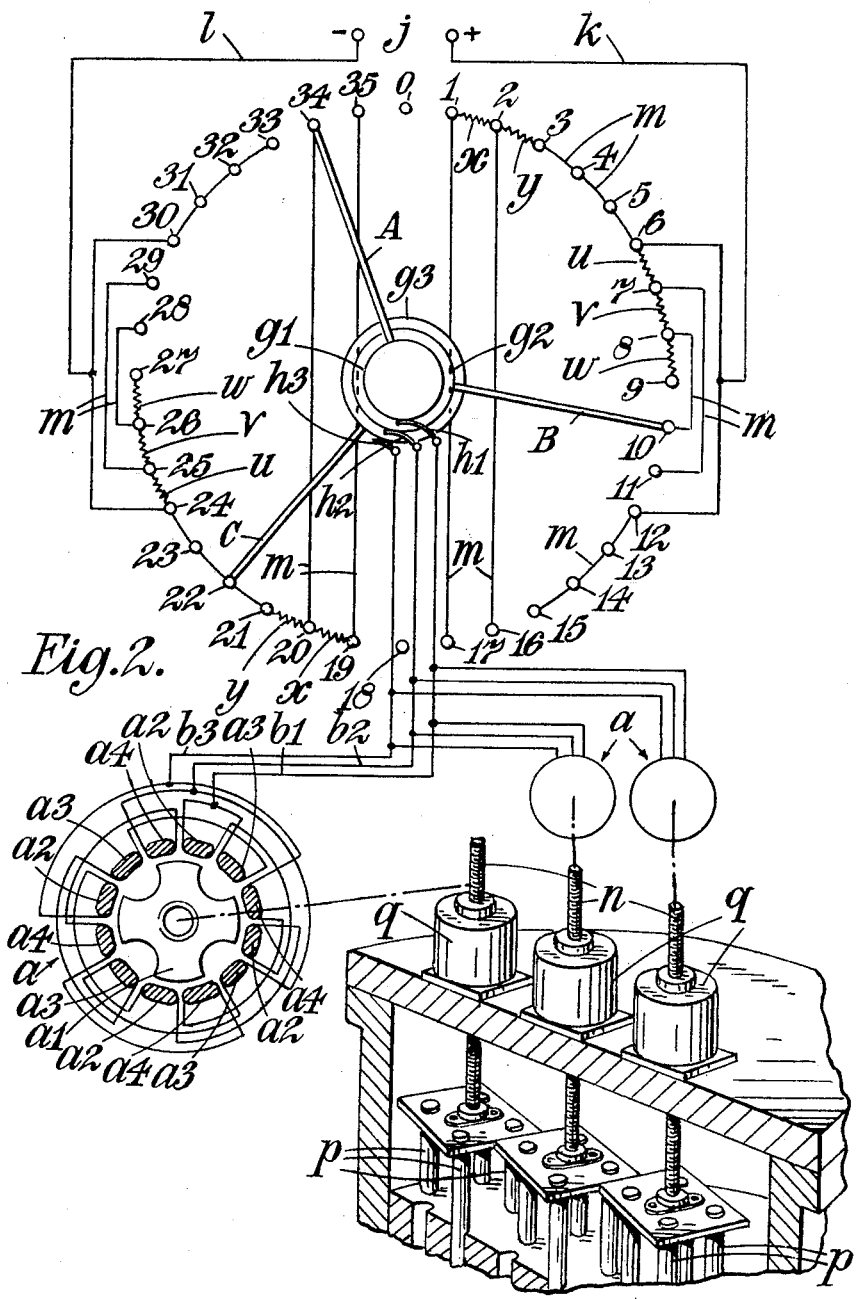
Figure 3:
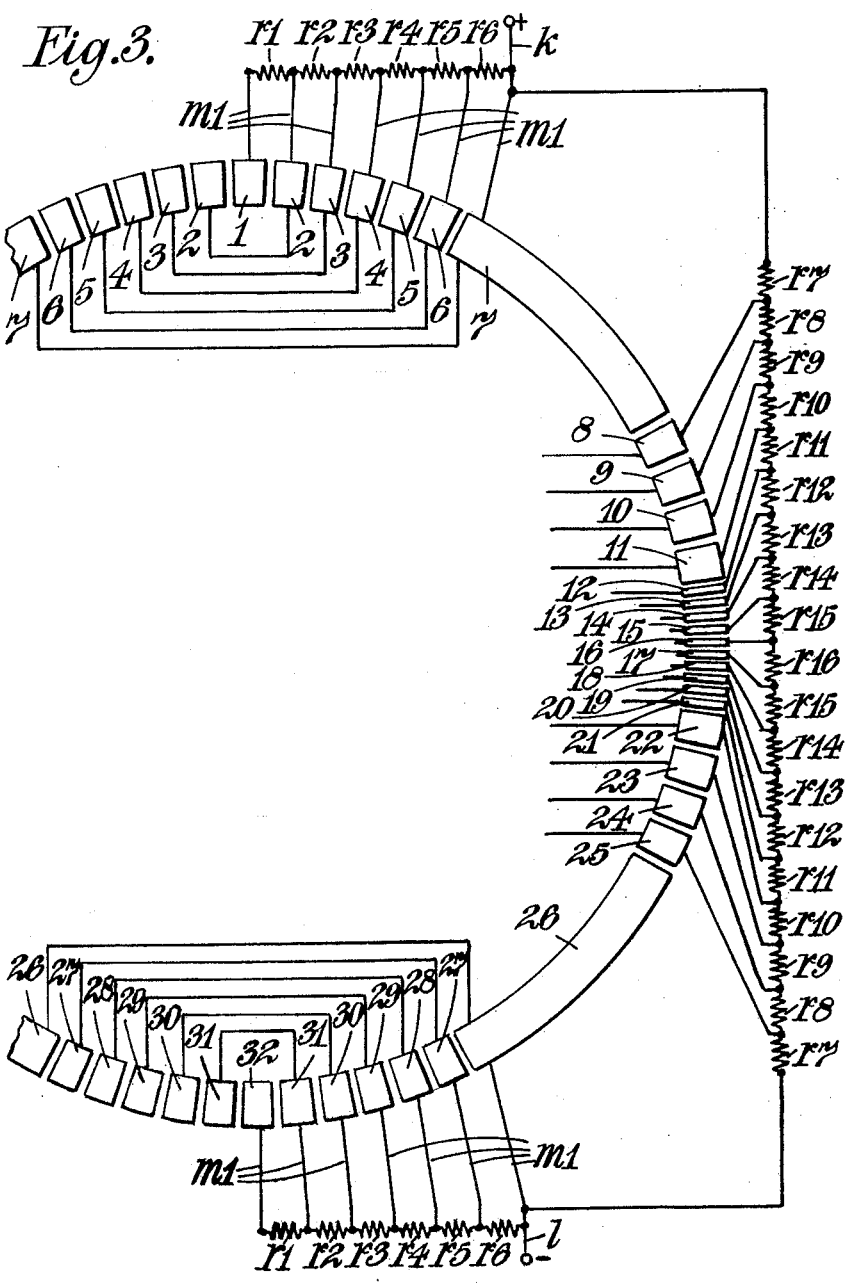

The invention and some ways in which it may be carried into effect will now be described with reference to the accompanying drawings, in which:

FIGURE 1 illustrates a simple form of potentiometer device by which a three-phase supply may be obtained from a D.C. source, FIGURE 2 illustrates one supply arrangement of the invention supplying a synchronous motor, and FIGURE 3 illustrates a second supply arrangement.

Referring to FIGURE 1, there is shown simple means, not forming part of this invention, by which electric power may be fed to a load as a 3-phase supply from a D.C. power source J. The positive and negative poles of the source J are connected to diametrically opposite points of a ring resistance K and there is provided a rotatively-driven member having three equi-angularly arranged contacts L, M, N running in contact with the resistance K and connected by slip rings P, Q, R to output leads S, T, U, respectively. As the contacts L, M, N rotate the potential difference between each of the pairs of output leads S, T; T, U; U, S varies in a cyclic manner, but the variation is not truly sinusoidal. Also since the whole of the ring resistance K is in circuit throughout operation considerable power losses occur and, also when the output current is high, difficulties may be experienced due to the need to cool the resistance K.

One power supply arrangement according to the present invention by which these difficulties and disadvantages can be mitigated is shown in FIGURE 2.

In this arrangement, the D.C. source is indicated at j, and the load is illustrated as a number of synchronous motors a for adjusting control rods p of a nuclear reactor. Each motor a drives a threaded shaft n which engages a fixed nut device q and carries a batch of the control rods p so that on rotation of the shaft n the control rods p are raised or lowered. Three motors a are shown and they are connected in parallel to the power supply arrangement.

Each of the motors $a$ is a delta-wound salient pole synchronous motor $a$ whereof the rotor is indicated at $a_1$ and the windings are $a_2$, $a_3$, $a_4$. There are four windings $a_2$ connected in series and similar sets of windings $a_3$ and $a_4$, the windings $a_2$ being connected between power output connections $b_1$ and $b_3$, the windings $a_3$ being across connections $b_2$ and $b_1$, and the windings $a_4$ being across connections $b_3$ and $b_2$ The source $j$ is connected to the motors by a power supply arrangement comprising a large number of contact studs (numbered 0–35 respectively) disposed in a ring in equi-angularly spaced relationship, and a rotatively-driven member having three contact elements A, B, C which are arranged delta-wise and are connected with slip rings $g_1$, $g_2$, $g_3$ respectively. The slip rings $g_1$, $g_2$, $g_3$ are contacted by brushes $h_1$, $h_2$, $h_3$ leading to the output connections $b_1$, $b_2$, $b_3$ respectively. The member is rotated by any convenient means, and is preferably operated on the make before break principle.

The contact studs 0 and 18 are isolated (i.e. they are insulated and have no supply connections) and the diameter joining them separates two sets of contact studs 1 to 17 and 19 to 35 respectively of which set 1 to 17 is connected by lead $k$ to the positive pole of the D.C. source $j$ and set 19 to 35 is connected by lead $l$ to the negative pole of the D.C. source.

The contact studs of each set are connected together through shorting connections $m$ and resistors $u$, $v$, $w$, $x$, $y$ so that the numerical pattern of the stud potenitals is symmetrical about the diameter joining studs 0 and 18, and so that the potentials of studs 27 through 0 to 9 are equal in value and sign respectively to those of studs 27 through 18 to 9 Thus it will be seen that on the positive side studs 3, 4, 5, 6, 12, 13, 14, 15 are at maximum positive potential, studs 7 and 11 are at the same positive potential, studs 8 and 10 are at the same potential, studs 2 and 16 are at the same potential and studs 1 and 17 are at the same potential. In other words the potentials of the contact studs are symmetrical in value and sign about a diameter of the ring of studs at right angles to the diameter connecting the isolated studs 0, 18.

The values of the resistors $u$, $v$, $w$, $x$, $y$ are suitably selected so that as the contact elements A, B, C rotate over the studs a substantially sine wave current is generated in the output connections $b_1$, $b_2$, $b_3$ and thus in motor windings $a_2$, $a_3$, $a_4$ In use the motor $a$ is caused to be operated by driving the rotatably-driven member so that the contact elements A, B, C run over the studs in succession. Thus each set of windings $a_2$, $a_3$, $a_4$ has applied across it a voltage which varies in a substantially sinusoidal fashion, and the motor will rotate at a speed dependent on the speed of rotation of the rotatively-driven member having the contact elements A, B, C.

It will be noted that at any instant in operation, a number of the contacts and resistors are inoperative to carry current.

This arrangement has a number of advantages as compared with the ring resistor arrangement above mentioned.

Firstly, there is an improvement in the current utilisation efficiency and at the design centre load value the wave form is sinusoidal. Furthermore the peak value of the motor phase current, and thus the power, is constant irrespective of the motor loading and this applies equally in the event that a winding of the motor falls due to open circuiting. Also the arrangement is simple so facilitating design.

In one particular example of the power supply arrangement shown in FIGURE 2, in which three motors are in parallel, each motor is designed to consume 1.5 k.w.

The D.C. supply voltage at $j$ is 200 volts.

The total phase resistance of the three motors is 13.3333 ohms i.e. each motor could have three windings, each winding having a resistance of 40 ohms per phase.

To provide a substantially sinusoidal current in the motor winding the values of the resistors would be:

|   | Ohms |
|---|---|
| $u$ | 0.1245 |
| $v$ | 0.3467 |
| $w$ | 0.5600 |
| $x$ | 11.2520 |
| $y$ | 3.9080 |

The overall efficiency in this case would be 91.66%.

Another power supply arrangement of this invention is shown in FIGURE 3. In this arrangement, there are 62 contact studs in the ring and the studs and their connections to the positive lead $k$ and negative lead $l$ are symmetrical about the diametrically-opposite studs numbered 1 and 32; the studs on each side of the diameter joining studs are therefore numbered similarly 2 to 31. Studs having like numbers are connected together by shorting connections $m_1$ so as to be at the same potential. Thus studs 2 are at the same potential, studs 3 are at the same potential, etc.

The studs have different angular extents; thus in each quadrant there is a single contact stud, 7 or 26, of large angular extent, a series of contact studs 1 to 6 and 8 to 11 or 22 to 25 and 27 to 32 of medium angular extent on each side of the contact stud 7 or 26, and a series of contact studs 12 to 21 of small angular extent on the side of the studs 8 to 11 or 22 to 25 remote from the associated stud 7 or 26.

The angular extent of the studs and their angular positions is based upon the assumption that the number of studs is an uneven multiple of 24 and that the studs are uniformly distributed around the ring. The studs 1 to 6, 8 to 11, 22 to 25, and 27 to 32 have angular extents and positions determined in this way, each of the studs 7 and 26 is equivalent to 7 such studs shorted together, and the studs 12 to 21 are equivalent to 3 such studs but are made of smaller angular extent so that a desired limit is placed upon the voltage difference between any pair of adjacent studs to prevent arcing.

The gaps between the studs is determined by the brush size on the contact elements and is, for example, equal to one fifth of the stud width, and the angular extent of the contact studs 12 to 21 is selected so that the contact element is only in contact with two or three of these studs at any instant.

The number of studs is also selected so that the losses due to the resistors described below is not excessive.

The studs 7 are connected directly to the positive lead $k$ and the studs 26 are connected directly to the negative lead $l$. The remaining studs 1 to 6, 8 to 25, and 27 to 32 are connected to the leads $k$, $l$ through resistors $r_1$–$r_{16}$ of selected value such that as the rotatively driven member (not shown) rotates the potential difference between each pair of output connections varies sinusoidally.

The resistor pattern is symmetrical about a diameter of the ring of studs at right angles to the diameter joining studs 1 and 32. Thus lead $k$ is connected to stud 1 through resistors $r_1$ to $r_6$ connected in series and the shorting connections $m$, for studs 2, 3, 4, 5, 6 are joined to the junctions between resistors $r_1$, $r_2$; $r_2$, $r_3$; $r_3$, $r_4$; $r_4$, $r_5$; $r_5$, $r_6$ respectively. Lead $l$ is connected to studs 27 to 32 by a like pattern of resistors $r_1$–$r_6$ and shorting connections $m_1$.

The leads $k$ and $l$ are joined by 19 resistors, $r_7$, $r_8$, $r_9$ ... $r_{15}$, $r_{16}$, $r_{15}$ ... $r_7$ connected in series and connections $s_1$ are taken from the junctions of the resistors $r_7$, $r_8$; $r_8$, $r_9$ etc. to the studs 8 to 25 respectively. The total resistance of the resistors $r_7$ to $r_7$ which are in continuous connection across the D.C. source is selected to be high relative to the phase resistance of the load.

In one example of the power supply arrangement of FIGURE 3 which is designed to supply 1.3 kw. from a 100 volt D.C. source to a single motor having a phase resistance of 11.54 ohms and which is assumed to have a continuous loss of 100 watts through the resistors, the contact studs have the angular extents and positions illustrated, and the resistors $r_1$ to $r_{16}$ have the following values:

| | Ohms | | Ohms |
|---|---|---|---|
| $r_1$ | 0.2661 | $r_9$ | 2,694 |
| $r_2$ | 0.2187 | $r_{10}$ | 4.860 |
| $r_3$ | 0.1728 | $r_{11}$ | 4.610 |
| $r_4$ | 0.1274 | $r_{12}$ | 5.923 |
| $r_5$ | 0.0799 | $r_{13}$ | 7.561 |
| $r_6$ | 0.0279 | $r_{14}$ | 9.569 |
| $r_7$ | 1.214 | $r_{15}$ | 12.0 |
| $r_8$ | 1.637 | $r_{16}$ | 12.0 |

The resistances $r_1$ to $r_{16}$ have such value that the potential difference between any pair of adjacent contact studs is approximately 12 volts and this has the advantage that excessive arcing is avoided. Over studs 12 to 21, the voltage difference between pairs of studs is constant and is designed to be approximately 12 volts.

The overall efficiency of the arrangement is of the order of 85%.

The arrangement also has the advantages of the construction of FIGURE 2.

In the arrangement of FIGURE 3 a mechanical device is provided to ensure that the contact elements do not stop in such a position that heavy current passes through a small area of the contact element.

In each of the arrangements of FIGURES 2 and 3, the motor and rotatably-driven member are said to be delta arranged; if desired a star wound motor may be used.

We claim:

An electrical power supply arrangement comprising
 (a) a D.C. supply having a first pole at a first potential and a second pole at a second potential,
 (b) a large number of contacts arranged in a ring in angularly spaced relation,
 (c) a rotatively-driven member having three equi-angularly spaced contact elements which cooperate with the contacts and on rotation of the rotatively-driven member engage the contacts successively,
 (d) separate electric output connections leading from each contact element, whereby each pair of the contact elements may be connected to a corresponding load,
 (e) said ring of contacts being arranged in four quadrants, each quadrant comprising centrally disposed equipotential contact means having an angular extent of substantially 30° and small contacts beyond each end of the said contact means,
 (f) the angular positions and angular extents of the contacts in the quadrants being symmetrical about a first diameter of the ring, two of said quadrants being on one side of said first diameter and two on the other side of said first diameter,
 (g) the D.C. supply having its first pole directly connected to the said centrally disposed contact means in one of said four quadrants,
 (h) a first set of resistor connections joining said first pole to the small contacts in the said one of said four quadrants on the side of the said centrally disposed contact means remote from the first said first diameter,
 (i) a second set of resistor connections joining said first pole to the other small contacts in the said one of said four quadrants,
 (j) corresponding direct connections between the second pole of the D.C. supply and the centrally disposed contact means in a second of said four quadrants, on the side of the first diameter opposite the said one quadrant,
 (k) corresponding first and second sets of resistor connections between the second pole and the small contacts in the said second quadrant of said four quadrants,
 (l) the angular positions and angular extents of the contacts being symmetrical also about a second diameter of the ring at right angles to said first diameter, and
 (m) direct connections between corresponding contacts on opposite sides of the said second diameter whereby the potential pattern at the contacts is symmetrical about the said second diameter.

References Cited in the file of this patent

UNITED STATES PATENTS

| 899,629 | Shoemaker | Sept. 29, 1908 |
| 1,245,356 | Koppitz | Nov. 6, 1917 |
| 1,691,986 | Nyquist | Nov. 20, 1928 |
| 1,703,242 | Kukel | Feb. 26, 1929 |
| 1,842,340 | Eaton | Jan. 19, 1932 |
| 2,929,014 | Bohm | Mar. 15, 1960 |

FOREIGN PATENTS

| 3,927 | Great Britain | Jan. 11, 1907 |
| 1,686 | Great Britain | Jan. 22, 1907 |